(No Model.)

J. L. JOHNSTON.
COMBINED SPOKE SOCKET AND TIRE FASTENER.

No. 349,434. Patented Sept. 21, 1886.

ATTEST
J. Henry Kaiser.
Harry L. Amer.

INVENTOR.
James L. Johnston.
By atty Wm. C. McIntire

UNITED STATES PATENT OFFICE.

JAMES L. JOHNSTON, OF TOPEKA, KANSAS.

COMBINED SPOKE-SOCKET AND TIRE-FASTENER.

SPECIFICATION forming part of Letters Patent No. 349,434, dated September 21, 1886.

Application filed July 3, 1886. Serial No. 207,094. (No model.)

*To all whom it may concern:*

Be it known that I, JAMES L. JOHNSTON, a citizen of the United States, residing at Topeka, in the county of Shawnee and State of Kansas, have invented new and useful Improvements in Combined Spoke-Sockets and Tire-Fasteners, of which the following is a specification.

This invention relates to certain new and useful improvements in the mode of securing the rims to the fellies and spokes of vehicles, whereby not only is the entire wheel rendered more substantial, but it can be made exceedingly light and durable.

The nature of the invention consists, essentially, in a metallic socketed clasping-ferrule and screw-fastener as a means for uniting the spokes of a wheel to the felly or rim and tire, as will be more fully understood from the description hereinafter following.

Figure 1:
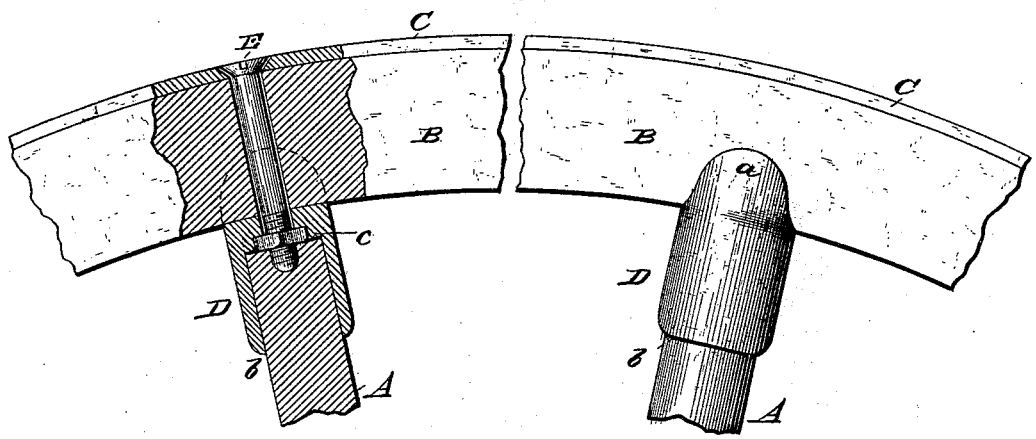
Figure 2:
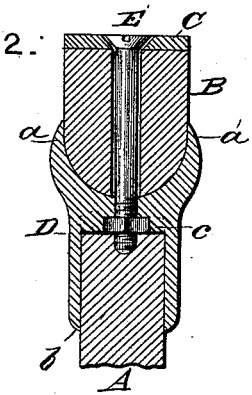
Figure 3:
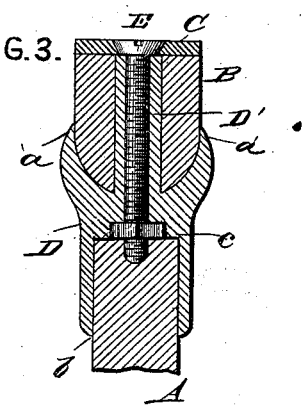
Figure 4:
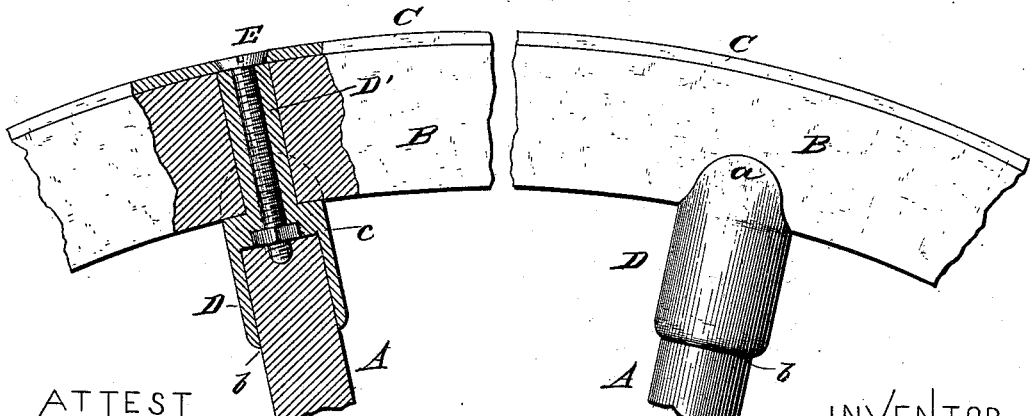

In the drawings, Figure 1 represents in section and by a side view spokes secured to the felly and tire of a wheel by my improved device. Fig. 2 is a vertical transverse section through Fig. 1 in the plane indicated by the dotted lines $x$ $x$. Fig. 3 is a similar section through Fig. 4, indicated by dotted line $y$ $y$ thereon. Fig. 4 is a sectional and side view similar to Fig. 1, showing a modification thereof.

Reference being had to the several parts marked thereon, A designates a wheel-spoke, B the felly, and C the tire, which may be constructed in the usual well-known manner.

D designates a metal ferrule, which consists of the thimble or socketed portion $a$, adapted to receive tightly the outer end of the spoke A, the outer end of which thimble is constructed with a concavity leaving flanges $a'$ $a'$, which form a solid seat for the convex inner side of the felly, as clearly shown in Figs. 2 and 3. In the bottom of the ferrule I form a recess adapted to receive a nut, $c$, and prevent it from turning. When the nut is dropped in its recess, the ferrule D is driven on the spoke and adjusted in place against the inner side of the felly, through which a hole is bored. A screw, E, is then introduced through the tire and felly and caused to enter the nut $c$. The parts are thus securely and rigidly tied together, and the spoke is held without materially weakening the felly.

In Figs. 1 and 2 I have represented the screw E as being passed directly through the wooden felly, but in practice I prefer for some wheels to form a cylindrical tenon, D', on the upper concave end of the ferrule D, which tenon is screw-tapped for receiving the screw E, which firmly binds the parts together and which has a metal bearing throughout its length, as clearly shown in Figs. 3 and 4.

From the above description it will be observed that I do not form tenons on the spokes, but bind the outer ends by means of metal ferrules which bear solidly against the felly and receive the metal screws; and also that I form the tenon-fastenings integral with the metal ferrules, and they may therefore be made of small diameter so as not to weaken the felly.

Having thus described my invention, what I claim as new, and desire to secure by Letters Patent, is—

The combination, with the felly, the spoke, and the tire, of a ferrule having a perforated tenon protruding centrally therefrom, and formed with a recess in its bottom, a nut fitting in such recess, and a screw-fastening binding the whole together, substantially as described.

In testimony whereof I have hereunto set my hand in the presence of two subscribing witnesses.

JAMES L. JOHNSTON.

Witnesses:
E. L. SMITH,
W. W. MITCHELL.